UNITED STATES PATENT OFFICE.

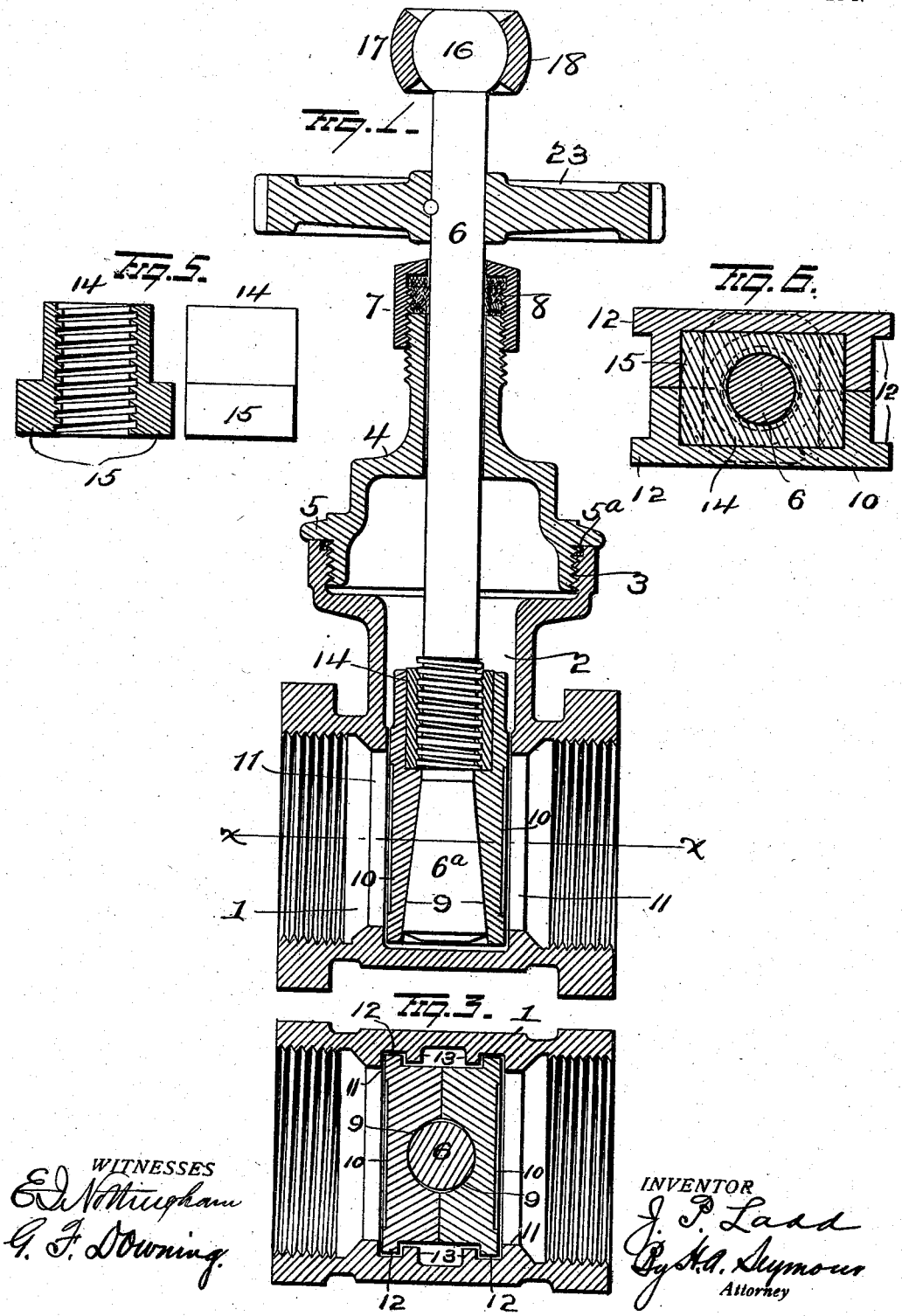

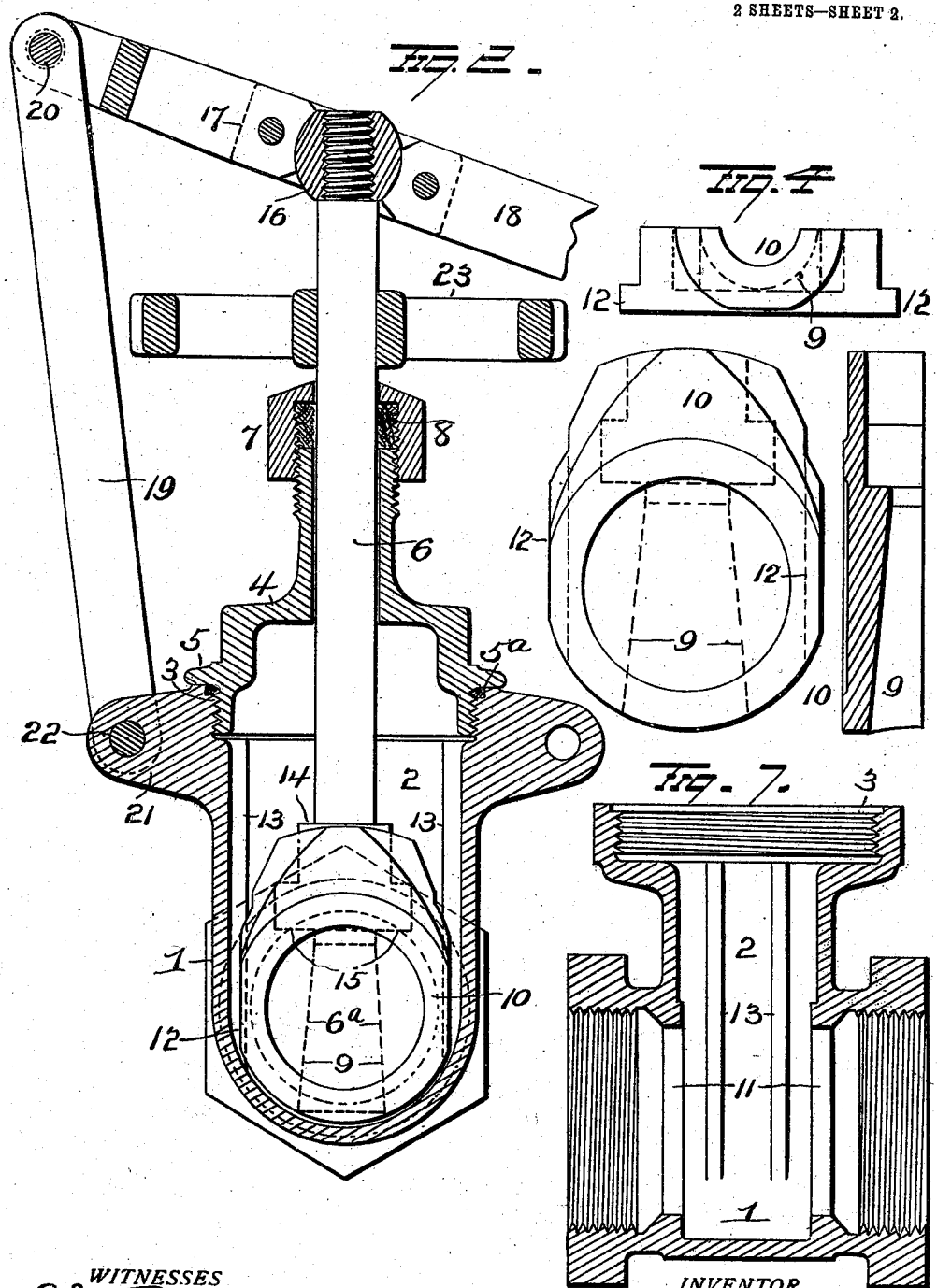

JOHN P. LADD, OF ALLIANCE, OHIO.

GATE-VALVE.

No. 840,633.         Specification of Letters Patent.         Patented Jan. 8, 1907.

Application filed October 14, 1903. Serial No. 177,046.

*To all whom it may concern:*

Be it known that I, JOHN P. LADD, a resident of Alliance, in the county of Stark and State of Ohio, have invented certain new and useful Improvements in Gate-Valves; and I do hereby declare the following to be a full, clear, and exact description of the invention, such as will enable others skilled in the art to which it appertains to make and use the same.

My invention relates to an improved gate-valve, the object of the invention being to provide improvements of this character in which the gates of the valve are carried by a stem, the turning of which latter serves to wedge the gates tightly in their closed position or release them from such position and also provide a lever for raising and lowering the stem and gates.

With this object in view the invention consists in certain novel features of construction and combinations and arrangements of parts, as will be more fully hereinafter described, and pointed out in the claims.

In the accompanying drawings, Figure 1 and Fig. 2 are views in vertical section, taken at right angles to each other. Fig. 3 is a view in section on the line $x\ x$ of Fig. 1, and Figs. 4, 5, 6, and 7 are views illustrating various details of construction.

1 represents the valve-casing, which has threaded angular ends for the attachment of connecting-pipes and is made with an upward extension or chamber 2, having a circular internally-screw-threaded head 3 to receive the external screw-threaded lower end of a cap or cover 4, which latter has a peripheral flange 5 to tightly secure a packing-ring in an internal recess $5^a$ in head 3 and form a tight joint. The upper portion of cap or cover 4 is contracted, forming a bearing for stem 6, and is externally screw-threaded to receive an internally-screw-threaded ring or nut 7, effectually clamping any approved form of packing 8 between the ring and upper end of cap or cover 4.

The stem 6 is made conical at its lower end $6^a$, fitting in semiconical recesses 9 in the adjacent faces of gates 10, which latter have milled outer faces to fit against the valve-seats 11 and are made with vertical flanges 12, movable vertically between guide-flanges 13 on the inner face of valve-casing 1 and the valve-seats 11.

The upper inner ends of the gates 10 are made with angular recesses to receive a nut 14, having internal screw-threads to engage external screw-threads on the cylindrical portion of stem 6. This nut 14 is made angular on its outer face to fit correspondingly-shaped recesses in the gates, preventing rotation of the nut, and tongues 15 are provided on opposite sides of the nut, entering correspondingly-shaped recesses in the gates, compelling the nut and gates to move vertically together.

On the upper contracted screw-threaded end of stem 6 a spherical head 16 is screwed and is mounted in a sectional spherical socketed portion 17 between the ends of a lever 18, one end of which latter is bifurcated to receive the upper end of a link 19, secured therein by a pin 20, and the lower end of said link is pivotally attached to a lug 21 on casing 1 by means of a pin 22. Below the spherical head 16 a hand-wheel 23 is secured on stem 6 to facilitate turning the same for a purpose which will be hereinafter explained.

The operation of my improvement is as follows: With the parts shown in Figs. 1, 2, and 3 to close the gates 10 hand-wheel 23 is turned to turn stem 6 in nut 14, and owing to the screw-threaded connection between them stem 6 will be elevated, drawing its conical end $6^a$ upward and causing it to wedge the gates 10 apart and in close contact with the seats 11. To open the gates, the hand-wheel 23 is turned in the reverse direction, lowering the conical end $6^a$ of stem 6 and permitting the gates 10 to fall back from their tight engagement with seats 11, when the lever 18 can be raised to elevate the stem and gates, giving a free passage through the casing.

A great many changes might be made in the general form and arrangement of the parts described without departing from my invention, and hence I would have it understood that I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. The combination with a valve-casing having parallel valve-seats, of two gates each having a curved tapering recess on its inner face and a recess in the upper end, a conical head between said gates and having bearings in the recesses thereof, a threaded nut located above the conical head and near the upper ends of the gates and having flanges engaging the recesses in the upper ends of the two gates, and a threaded stem passing through said nut and rigid with said conical head.

2. The combination with a valve-casing having parallel valve-seats therein, of two gates each having a curved tapering recess, the two recesses forming a conical space larger at its lower end, each gate also having a recess at its upper end, each recess communicating with a socket also formed in the gate, a nut located within the recesses in the upper ends of the gates and provided with flanges which rest in the sockets communicating with said recesses, and a stem having a conical lower end resting within the conical space between the gates, and also having threads to engage the nut, substantially as described.

In testimony whereof I have signed this specification in the presence of two subscribing witnesses.

JOHN P. LADD.

Witnesses:
M. L. SEACRIST,
A. L. ROBERTS.